(12) United States Patent
Larsson

(10) Patent No.: US 8,347,753 B2
(45) Date of Patent: Jan. 8, 2013

(54) INDUSTRIAL ROBOT WITH TUBULAR MEMBER FOR A CABLE HARNESS

(75) Inventor: Jan Larsson, Vasteras (SE)

(73) Assignee: ABB AB (SE)

( * ) Notice: Subject to any disclaimer, the term of this patent is extended or adjusted under 35 U.S.C. 154(b) by 674 days.

(21) Appl. No.: 12/492,918

(22) Filed: Jun. 26, 2009

(65) Prior Publication Data
US 2009/0314120 A1    Dec. 24, 2009

Related U.S. Application Data

(63) Continuation of application No. PCT/EP2007/064365, filed on Dec. 20, 2007.

(30) Foreign Application Priority Data

Dec. 27, 2006 (EP) .................................. 06127234

(51) Int. Cl.
*B25J 17/00* (2006.01)

(52) U.S. Cl. ............... 74/490.01; 74/490.02; 74/490.03; 74/490.07; 901/16; 901/23; 901/25; 901/29

(58) Field of Classification Search ............... 74/490.01, 74/490.02, 490.03, 490.05, 490.06; 901/16, 901/19, 23, 25, 29
See application file for complete search history.

(56) References Cited

U.S. PATENT DOCUMENTS

| 6,250,174 | B1 | 6/2001 | Terada et al. | |
| 2002/0007692 | A1* | 1/2002 | Albertsson et al. | 74/490.02 |
| 2008/0034920 | A1* | 2/2008 | Inoue et al. | 74/665 M |
| 2008/0236324 | A1* | 10/2008 | Inoue et al. | 74/490.02 |
| 2008/0271561 | A1* | 11/2008 | Ohara et al. | 74/490.01 |

FOREIGN PATENT DOCUMENTS

| EP | 1568449 A1 | 8/2005 |
| EP | 1671755 A1 | 6/2006 |
| JP | 63306888 A | 12/1988 |
| JP | 1257592 A | 10/1989 |
| JP | 5131388 A | 5/1993 |
| JP | 7100787 A | 4/1995 |
| JP | 2004306072 A1 | 11/2004 |
| JP | 2005014103 A | 1/2005 |
| JP | 2005066718 A | 3/2005 |
| JP | 2006021299 A | 1/2006 |
| WO | 9826906 A1 | 6/1998 |

OTHER PUBLICATIONS

International Search Report and Written Opinion of the International Searching Authority; PCT/EP2007/064365; Feb. 27, 2008; 12 pages.

* cited by examiner

*Primary Examiner* — David M Fenstermacher
(74) *Attorney, Agent, or Firm* — St. Onge Steward Johnston & Reens LLC

(57) ABSTRACT

A robot arm for an industrial robot, including a first arm part and a second arm part, where the second arm part is rotatably journalled in the first arm part for rotation about a first axis of rotation, characterized in that the second arm part includes a tubular member, rotatably journalled in the first arm part, so that the tubular member is configured to support the robot arm.

13 Claims, 7 Drawing Sheets

INDUSTRIAL ROBOT WITH TUBULAR MEMBER FOR A CABLE HARNESS

CROSS-REFERENCE TO RELATED APPLICATIONS

The present application is a continuation of pending International patent application PCT/EP2007/064365 filed on Dec. 20, 2007 which designates the United States and claims priority from European patent application 06127234.0 filed on Dec. 27, 2006, the content of which is incorporated herein by reference.

FIELD OF THE INVENTION

The present invention relates to a robot arm for an industrial robot and especially a robot arm supporting a wrist and a robot tool mounted thereon.

BACKGROUND OF THE INVENTION

When designing industrial robots, it is common to arrange the cable harness, necessary for the robot, internally of the robot. For welding robots, it is equally common for the cable harness to be arranged so as to extend outside the upper arm of the robot up to an offset welding gun. This provides a space-demanding arrangement. In the case of internally extending cable harnesses, there is always a risk of hooking onto, for example, a workpiece, such as a car body. The risk of hooking is especially great if the cable harness is running freely outside the upper arm of the robot up to the tool.

In both externally and internally extending cable harnesses, problems with deformation and torsion of cables and wires arise. Problems arise in particular when the robot is to be able to bend its wrist more than 90°. Cables, for example for electric power to welding electrodes, power supply to tools and robot, electric signal cables for transmission of information from sensors at the welding head, hoses for compressed air and coolant etc. are to manage the necessary bending while simultaneously rotating in spite of the fact that they provide considerable resistance to such bending and rotation.

When positioning the working tools of an industrial robot, problems arise when the cable harness extends externally. The rapid movements of the robot result in an externally extending cable harness flinging round the upper arm of the robot and result in a deterioration of the working accuracy of the robot. The solution so far has been to control the speed and hence reduce the speed of the robot before, for example, welding operations in order to reduce the unwanted movements of the cable harness and hence to attempt to maintain an acceptable welding accuracy.

The term cable harness here refers to a process cable harness, which may be surrounded by a casing for, for example, welding electrodes, power supply for the tool itself and/or power supply to the robot. In addition, the term comprises spare wires for, for example, the various requirements of the client.

The prior art comprises industrial robots for, for example, welding applications, which are arranged with the process cable harness extending with a considerable offset with respect to the three axes of rotation in the upper arm. These solutions are space-demanding.

One long-felt need is that of a space-saving robot. The need primarily applies to a space-saving upper arm and wrist, which may enter into narrow spaces. To this is to be added the robot user's need of a flexible robot design that facilitates replacement of robot application. When manufacturing car bodies, for example, there is a need of a compact robot arm for welding applications, that is, a robot arm provided with a welding cable harness.

This need cannot be fulfilled by any of the industrial robots disclosed in the cited documents.

SUMMARY OF THE INVENTION

The object of the present invention is to provide a space-saving robot arm for an industrial robot. The intention is also to adapt the robot arm to a design that is suitable for a process cable harness.

Furthermore, the object is to make possible a simple replacement of a cable harness.

The solution according to the invention, according to a first aspect, is to provide a robot arm having features as described in the claims. The solution according to the invention, according to a second aspect, is to provide a method of operating an industrial robot, comprising a robot arm according to the invention.

Advantageous embodiments are described in dependent sub claims.

The solution according to the first aspect of the invention is to provide a robot arm intended to be connected to an industrial robot to carry a wrist unit and a robot tool applied thereon. The robot arm comprises a first arm part and a second arm part, wherein the second arm part is rotatably journalled in the first arm part for rotation about a first axis of rotation A. Further, the robot arm comprises a tubular member arranged with a second end secured to the second arm part and with a first end rotatably journalled in the first arm part in a first and second bearing arranged at a distance along the axis A such that the tubular member forms a continuous channel intended to receive a cable harness extended through there.

In this way, a robot arm is formed with a tubular member, which allows a process cable harness, arranged centred and extending inside and through the tubular member, to pass through the first and second arm part, out of the robot, to run freely and openly up to and be connected to the tilt included in the wrist unit. The bearings are arranged coaxial in relation to the rotational axis A and within the first arm part.

For safety reasons, the tubular member is made of a material that causes it to screen off between the process cable harness and the motor cable harness with respect to signals, fields of force, etc.

It is part of the inventive concept that the tubular member does not necessarily have a circular cross section. It may have an edged cross section with an optional number of edges. The tubular member may also be provided with one or more holes.

The wrist further comprises a rotatably journalled wrist part, designated tilt in the following. The tilt is rotatably journalled in the wrist for rotation about a second axis of rotation B. A turn disc is mounted on the tilt for rotation about a third axis of rotation C. The turn disc is adapted to receive a robot tool.

Allowing the cable harness to run freely, centred, between the robot arm and the wrist implies that a rotation of the wrist and a subsequent bending of the cable harness occur along a comparatively long section of the cable harness. Bending of the cable harness along a comparatively long section saves the cable harness from wear and prolongs its service life.

According to a feature of the invention, the second arm part comprises a shell with a first portion configured to surround a first part of the tubular member extended in the longitudinal direction along the first axis of rotation A and a second portion with an elongated shape. The second portion is arranged, in its longitudinal extent, along and at a distance from the first axis of rotation A and is configured to surround/accommodate a first part of the tubular member.

The term shell is defined as an envelope surface which has a supporting function in the robot arm.

According to a feature of the invention, a second arm part comprises a first and a second drive unit arranged with their respective axes of rotation offset with respect to the axis of rotation A. In one embodiment, the first and second drive units are arranged one after the other inside a second arm part.

It is part of the inventive concept that the first and second drive devices should be arranged adjacent to each other with parallel axes of rotation, arranged in parallel with axis A.

According to a feature of the invention, the second drive unit is adapted to rotate a turn disc comprised in the tilt about a third axis of rotation C.

According to a feature of the invention, the second arm part comprises a first drive unit configured to rotate a wrist unit comprising a tilt about a second axis of rotation B.

It is part of the inventive concept that a first and/or a second drive device drive some type of angle transmission. In one embodiment, each respective drive device is configured to drive a pinion in a hypoid gearing.

According to a feature of the invention, the robot arm is provided with a wrist unit which is journalled in a single bearing on the arm. The wrist unit is composed with the aid of angle transmissions, which enables the distance between the first and second pinions to be minimized.

According to a feature of the invention, the second arm part is configured to surround/accommodate a first part of the tubular member.

The purpose is to arrange a narrow and compact robot arm and a wrist unit. This is achieved by arranging angle transmissions in the tilt, whereby the distance between the axes of rotation of the pinions may be minimized. By arranging the drive units one after the other, the possibility of a narrow and compact wrist unit is utilized.

According to a feature of the invention, the second arm part is formed with an L-shaped shell and comprises a tubular member configured to form a continuous channel, the task of which is to receive and accommodate a continuous process cable harness to be connected to a robot tool.

According to a feature of the invention, the process cable harness is arranged to run freely between an orifice in the channel in the second arm part and a tilt, arranged on the second arm part, and pass through a hollow shaft comprised in the tilt in order to reach a robot tool on the turn disc of the tilt. This arrangement of the cable harness facilitates the replacement of a robot the application since the cable harness is easy to mount/remove.

According to a feature of the invention, the free length of the cable harness runs past a joint designed for rotating a tilt about a second axis of rotation B. In one embodiment, axis of rotation B and axis of rotation A cross each other at right angles.

According to a feature of the invention, the wrist unit is arranged journalled in a single bearing.

The solution according to the second aspect of the invention is a method of operating an industrial robot with a robot arm comprising a first arm part and a second arm part. The second arm part is rotatably journalled in the first arm part for rotation about a first axis of rotation A. The robot arm comprises a tubular member arranged with a second end secured to the second arm part and with a first end rotatably journalled in the first arm part in a first and second bearing arranged at a distance along the axis A. A wrist unit is attached to the second arm part comprising a tilt adapted for rotation about a second axis of rotation B and a turn disc adapted for rotation about a third axis of rotation C. The robot further comprises a cable harness extended through the channel of the tubular member running freely to and through the tilt being attached to the turn disc. The method comprising rotating the tilt about the axis of rotation B wherein a bending of the cable harness and a movement freely in the axial direction in the channel through the second arm part occurs and/or rotating the turn disc about the third axis of rotation C wherein a free turning of the cable harness about its longitudinal axis takes place.

Allowing the cable harness to run freely, centred, between the robot arm and the wrist implies that a rotation of the wrist and a subsequent bending of the cable harness occur along a comparatively long section of the cable harness. Bending of the cable harness along a comparatively long section saves the cable harness from wear and prolongs its service life.

It is to be understood that the purpose of the embodiments described herein is to illustrate the present invention. It is considered that the invention includes additions, reductions and/or modifications of the embodiments which are described in the claims and which are considered obvious to a person skilled in the art.

BRIEF DESCRIPTION OF THE DRAWINGS

In the following the invention will be described in greater detail by means of embodiments and with reference to the accompanying drawings, wherein.

DETAILED DESCRIPTION OF THE INVENTION

An industrial robot comprises a control system, a manipulator with drive units designed to attend to rotation in the joints included in the manipulator. Each drive unit comprises an electric motor, a brake and a gear and transmits rotational movements to the respective joint in operation of the robot.

Figure 1:
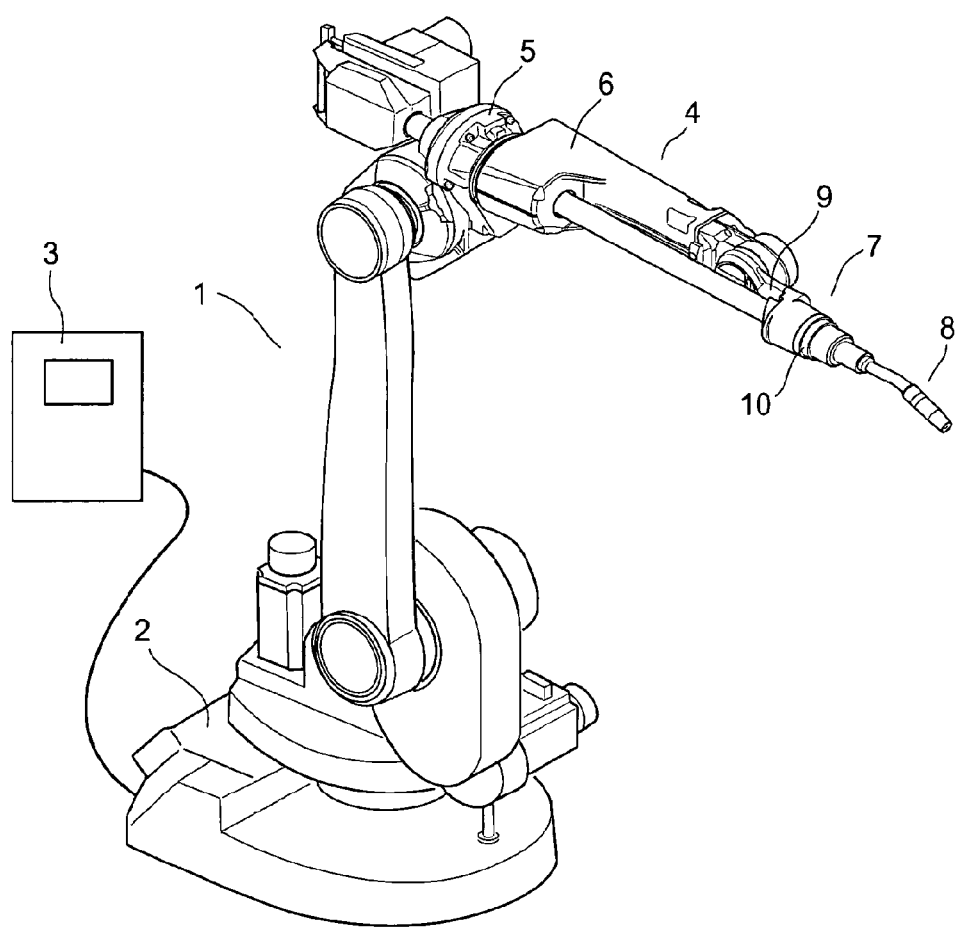
FIG. 1 is an industrial robot equipped for welding.

FIG. 1 is a six-axis industrial robot 1 comprising a manipulator 2 and a control unit 3.

A robot arm 4 is journalled in a single bearing and arranged in the robot to support a wrist 7 and a robot tool 8 mounted thereon. The robot arm 4 comprises two parts, a first arm part 5 and a second arm part 6, whereby the second arm part 6 is rotatably journalled in the first arm part for rotation about a first axis of rotation A. The wrist 7 is arranged at the outer end 6a of the second arm part 6. The wrist further comprises a rotatably journalled wrist part 9, here designated tilt. The tilt 9 is rotatably journalled in the wrist for rotation about a second axis of rotation B. A turn disc 10 is mounted on the tilt for rotation about a third axis of rotation C. The manipulator is connected to a control system in a control unit 3.

Figure 2:
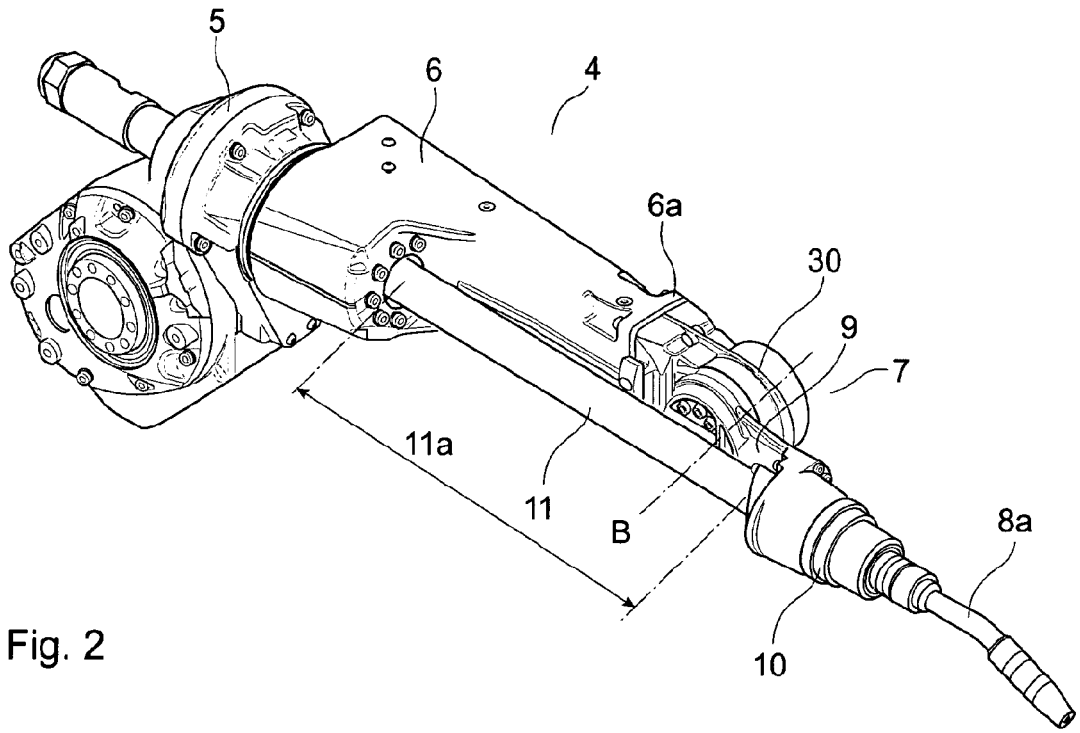
FIG. 2 is a robot arm equipped for welding.

FIG. 2 is a robot arm 4 equipped for welding. The robot tool is constituted by a welding gun 8a. A process cable harness 11 is arranged extending through the robot arm 4 and is connected to the welding gun. A length 11a of the cable harness 11 is arranged freely extending between the second arm part 6 and a wrist unit 7 arranged on the second arm part. The free length 11a of the cable harness extends up to and past a first joint 30 in the wrist unit 7. The first joint 7 is configured for rotation of the tilt 9, included in the wrist, around a second axis of rotation B.

Figure 3:
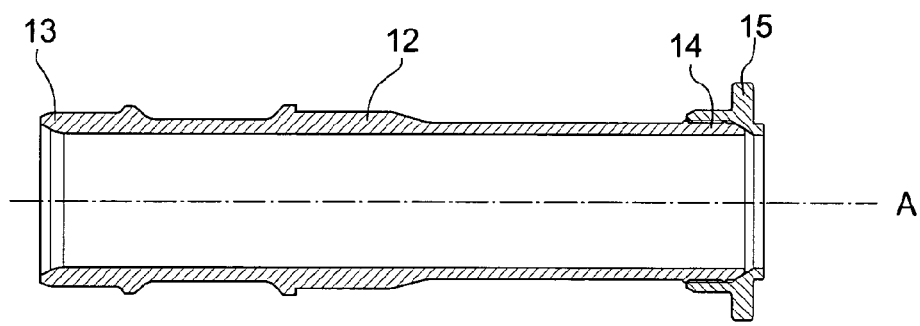
FIG. 3 is a longitudinal section through a tubular member.

FIG. 3 is a cross section through a tubular member 12, included in the robot arm, with a first end 13 and a second end 14. The tubular member 12 is provided at its second end 14 with a flange 15.

Figure 4:
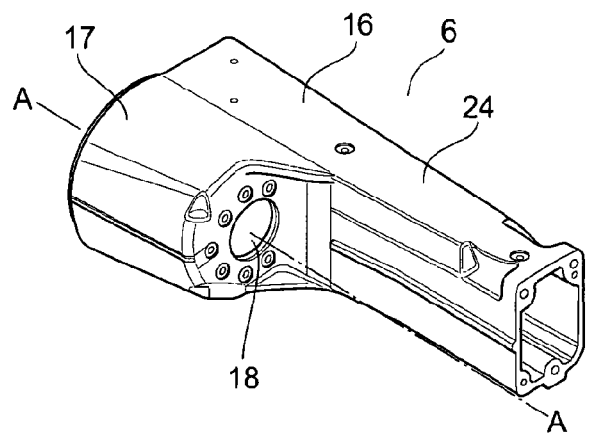
FIG. 4 is a longitudinal section through a robot arm.

FIG. 4 is a shell 16 which constitutes the outer envelope surface of a second arm part 6. The shell 16 comprises a first portion 17 with an elongated shape and is provided with an opening 18. Further, the shell comprises a second portion 24 with an elongated shape. The second portion 24 has a comparatively longer extent in the longitudinal direction compared with the first portion 17. The shell 16 may thus be said to exhibit an L-shape.

Figure 5:
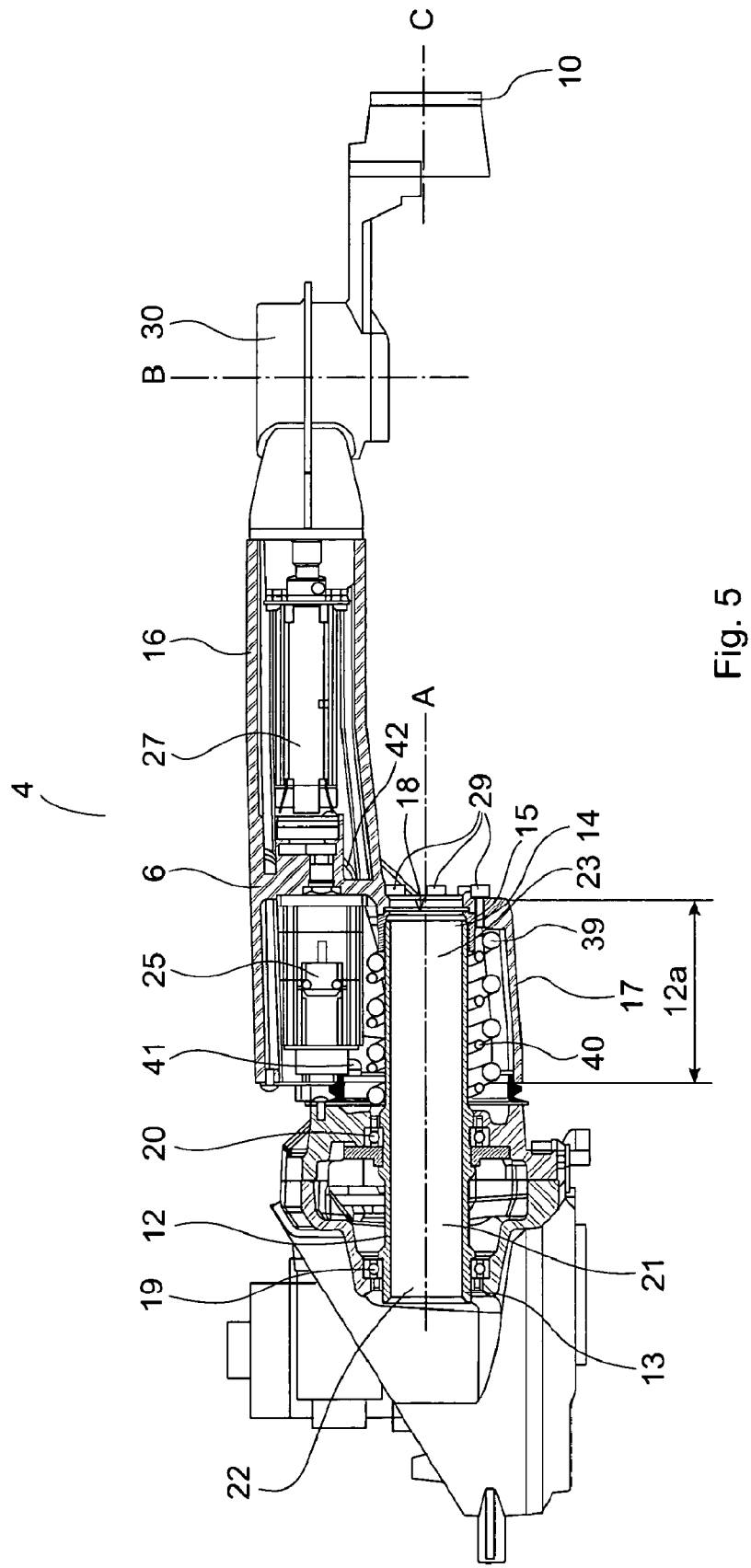
FIG. 5 is a longitudinal section through a robot arm.

FIG. 5 is a cross section through a robot arm 4, in which a tubular member 12 with a flange 15 is arranged. The second arm part 6 comprises a shell 16 which, with a first portion 17, is arranged to surround a first part 12a of the tubular member 12. The opening 18 of the first portion 17 and the flange 15 conform to each other with respect to shape.

The tubular member 12 is secured to the second end 14 in the opening 18 through the flange 15 and with the aid of the fastening device 29. Further, the tubular member 12 is journalled at its first end 13 in a first bearing 19 secured to the first arm part 5 for rotation about the first axis of rotation A. Further, the tubular member 12 is journalled in a second bearing 20 secured to the first arm part 5 at a distance from the first bearing 19. The tubular member 12 is thus rotatably journalled in the first arm part and secured to the second arm part and hence configured to support the robot arm.

The tubular member 12 is arranged in the robot arm 4 extending in the longitudinal direction along the first axis of rotation A. The tubular member 12 is secured to and rotates with the second arm part 6 about the first axis of rotation A. With the tubular member 12, a continuous channel 21 through the first arm part 6 is obtained. The channel 21 has a first orifice/opening 22 in the first arm part 5 and a second orifice/opening 23 in the second arm part 6. The channel 21 is intended to receive and lead a process cable harness 11 through the robot arm 4.

A shell 16, which constitutes the outer envelope surface of a second arm part 6, has a second portion 24 which in its longitudinal extent is arranged along and spaced apart from the first axis of rotation A.

At least one cable harness is arranged in the form of a spiral. The spiral is arranged in a second arm part and is arranged circumscribed outside a longitudinal section of the tubular member. A cable harness 40 for power and signal transmission to the first drive unit 25 is arranged so as to circumscribe the tubular member 12. A cable harness 39 for power and signal transmission to the second drive unit 27 is arranged so as to circumscribe the tubular member 12. The cable harnesses 39 and 40 are arranged in a spiral surrounding the tubular member 12. The spiral comprises sufficient cabling to allow rotation of the second arm part 6 about the first axis of rotation A. Upon rotation of the arm part 6 about the first axis of rotation A, the diameter of the spiral increases/decreases symmetrically over the extent of the spiral along its longitudinal axis. In FIG. 5, a coupling 41 of the cable harness 40 to the first drive device 25 and a coupling 42 of the cable harness 39 to the second drive device 27 are indicated.

Figure 6:
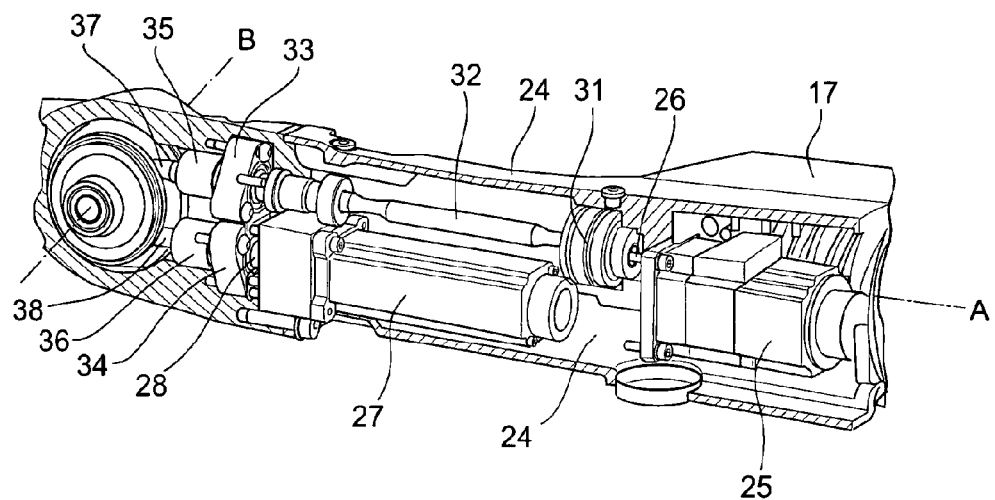
FIG. 6 is the inside of the second part of a robot arm.

FIG. 6 is a section of a second portion 24 of a shell 16 in a second arm part 6, whereby the inside of the second arm becomes visible. The second arm part 6 is configured to accommodate, inside the second portion 24 of the shell 16, a first drive unit 25 arranged with its drive shaft 26 parallel to and offset with respect to the first axis of rotation A. The first drive unit 25 is configured to rotate a wrist unit 7, arranged on the second arm part 6, about a second axis of rotation B (FIG. 5).

The second arm part 6 is configured to accommodate, inside the second arm part 24 of the shell 16, also a second drive unit 27. The second drive unit 27 is arranged with its drive shaft 28 parallel to and offset with respect to the first axis of rotation A and with respect to the drive shaft 26 of the first drive unit. The second drive unit 27 is configured to rotate a turn disc 10, arranged on a wrist 7, about a third axis of rotation C (FIG. 6). The wrist is arranged on the robot arm with the axis of rotation C arranged in the same plane as the first axis of rotation A.

The first drive unit 25 is configured to rotate a wrist 7, arranged on the second arm part 6, about a second axis of rotation B, which intersects and forms an angle with the first axis of rotation A. The drive shaft 26 of the first drive device is arranged laterally displaced via a first gear 31 and a drive shaft extender 32, which in turn is mounted directly, via a first coupling 33, on a first pinion 37 in a first hypoid gearing 35.

The drive shaft 28 of the second drive device 27 is mounted directly, via a second coupling 34, on a second pinion 38 in a second hypoid gearing 36. The axes of rotation of the respective pinions are arranged offset with respect to the second axis of rotation B. This design allows the first 25 and second 27 drive units to be arranged one after the other in the longitudinal direction inside the second arm part 6.

Figure 7:
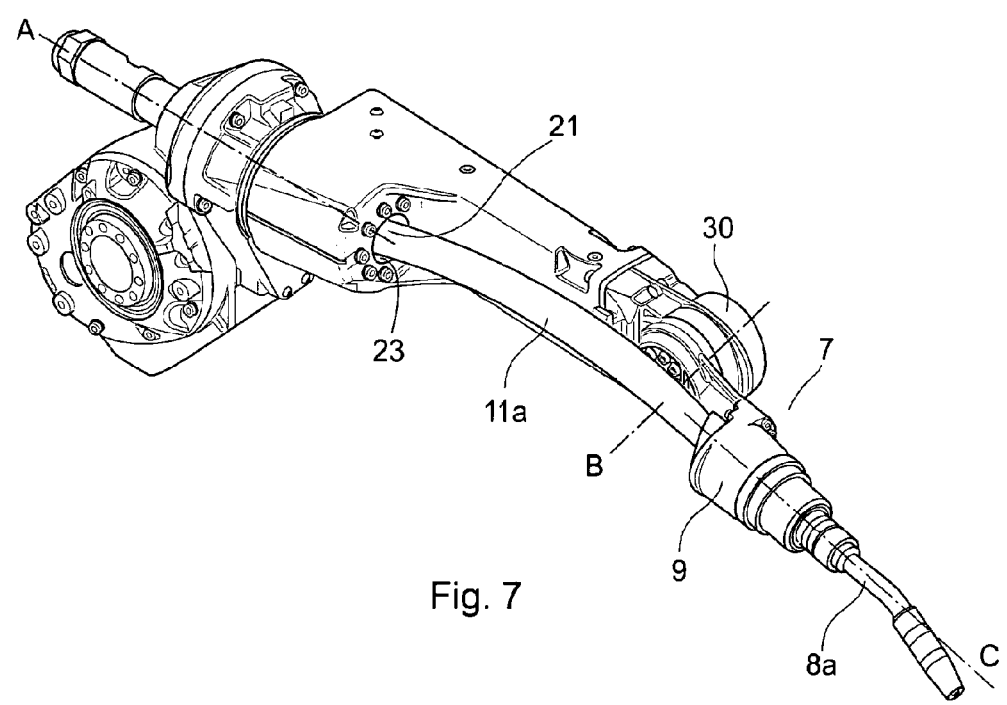
FIG. 7 is a robot arm with a bent process cable harness.

FIG. 7 is the robot arm in FIG. 2 with a length 11a of the cable harness 11 arranged freely extending between the orifice 23/opening 18 and the tilt 9 included in the wrist unit 7. The tilt comprises a turn disc 10 and a welding gun 8a arranged on the turn disc. The free length 11a of the cable harness is arranged extending up to and past a first joint 30 configured for rotation of the tilt 9 about a second axis of rotation B.

Upon rotation of the tilt about the axis of rotation B, a bending of the cable harness 11a occurs, which requires an increase in length of the free length 11a. The process cable harness is adapted to move freely in the axial direction in the channel 21 through the second arm part 6.

Figure 8:
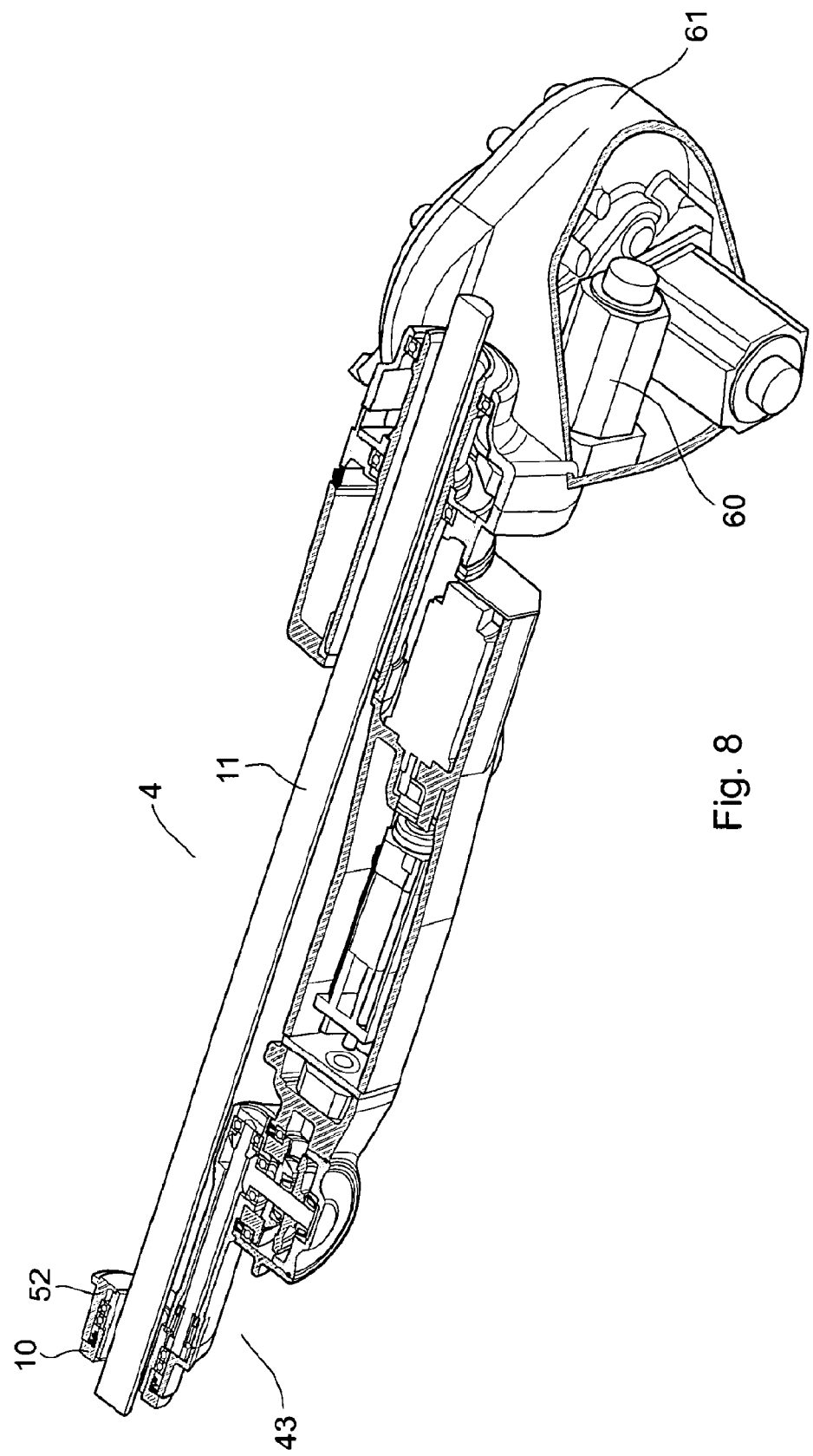
FIG. 8 is a longitudinal section through a robot arm with a wrist unit.

FIG. 8 is a longitudinal section through a robot arm 4 with a wrist unit 7 and a tilt 9. A hollow shaft 52 is configured to accommodate a continuous cable harness 11 intended to supply a robot tool (not shown) arranged on the turn disc 10. A third drive unit 60 is comprised in the robot arm 4 for driving the second arm part 6 to rotate about the first axis of rotation A. The drive unit is arranged in a drive unit housing 61 carrying the first arm part (5).

Figure 9:
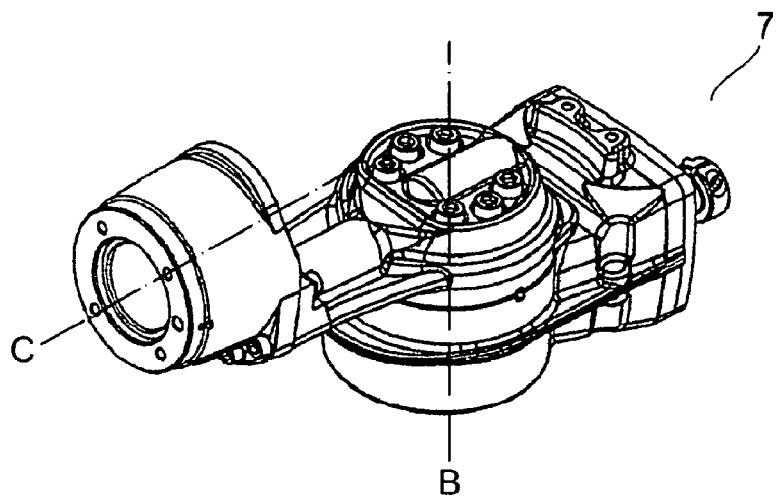
FIG. 9 is a wrist.

FIG. 9 is a wrist unit 7 arranged as a module adapted to be arranged on a second arm part 6.

Figure 10:
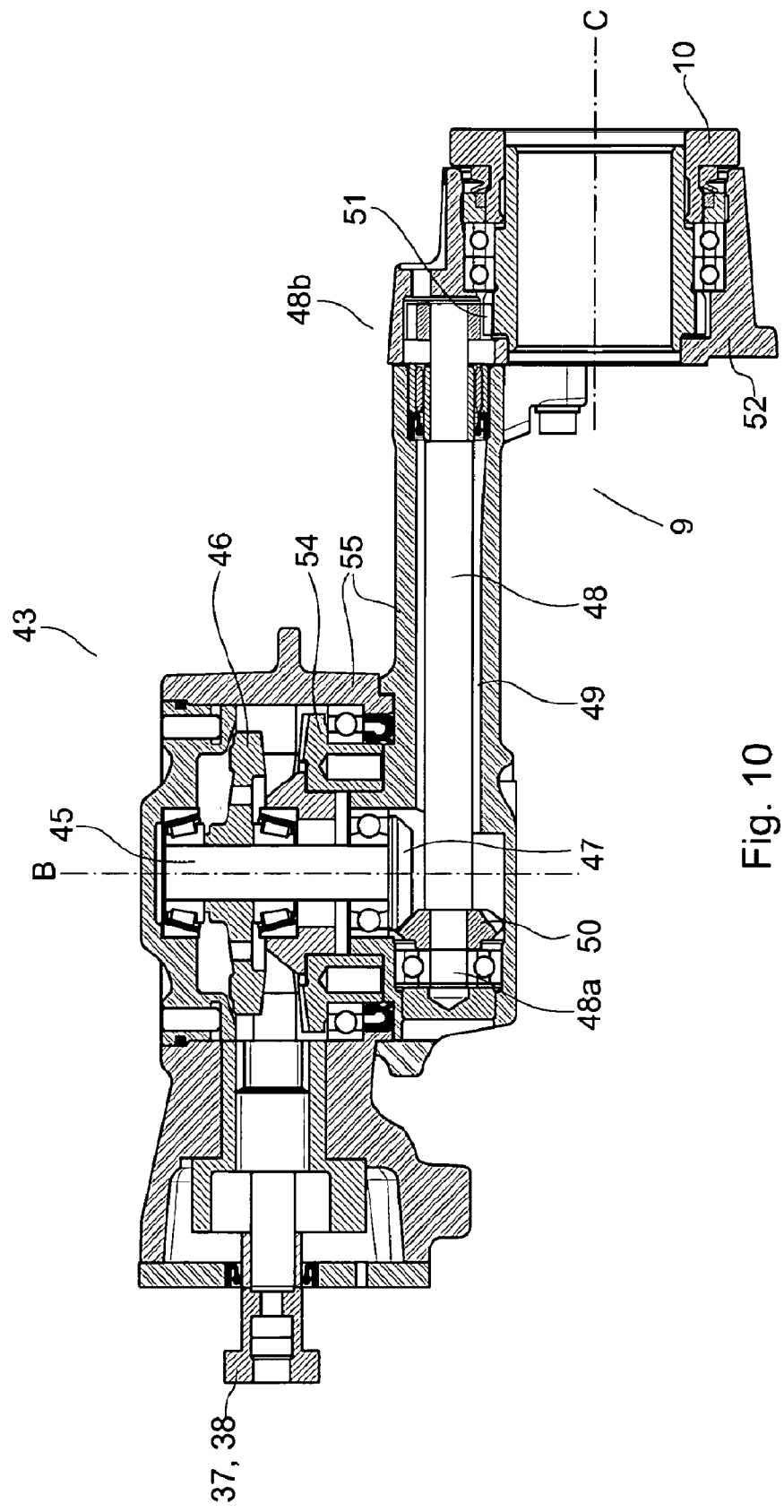
FIG. 10 is a cross section through a wrist unit.

FIG. 10 is a cross section through the wrist unit 7 in FIG. 8. For rotation of the turn disc 10 about axis C, rotation is transmitted from the second drive unit 27 to a second pinion 38 and further from the pinion 38 via gear mesh to a second angle transmission 44, which comprises a first conical gear wheel 46 (step 1) arranged on a first drive shaft 45 in the wrist. A second conical gear wheel 47 is arranged on the first drive shaft 45 in the wrist spaced apart from the first gear wheel 46. Upon rotation of the first drive shaft 45, the second conical gear wheel 47 is rotated. A second drive shaft 48 is arranged at an angle to the first drive shaft and is arranged in a tilt arm 49. A third conical gear wheel 50 is arranged at a first end 48a of the second drive shaft 48 in the wrist and is configured, via gear mesh, to transmit rotation from the second conical gear wheel 47 to the second drive shaft 48 (step 2). The second drive shaft is provided at its second end 48*b* with a parallel gearing 51, which in turn transfers the rotation of the second drive shaft 48 into rotation of a turn disc 10 arranged on the hollow shaft 52.

For rotation of the tilt 9 about the second axis of rotation B, rotation is transmitted from a first drive unit 25 via gear mesh in a first gearing 31 (step 1) arranged in a second arm part 6 of a robot arm 4 (FIG. 6). Via the first gearing 31, rotation is transmitted through a drive shaft 32 to a first pinion 37. The first pinion is configured, via gear mesh, to transmit the rotational movement to a fourth gear wheel 54 (step 2). The fourth gear wheel 54 is arranged coaxially with the second axis of rotation B on an inner envelope surface 55 of the tilt 9.

Figure 11:
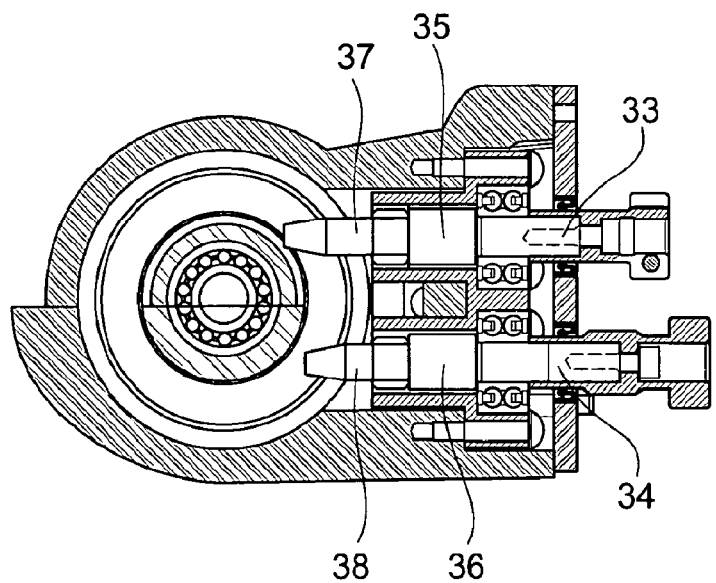
FIG. 11 is a section through the wrist unit transversely of the axis B.

FIG. 11 is a section through the wrist unit transversely of the axis B. In this section, the first 37 and second 38 pinions are arranged below each other.

Upon rotation of the turn disc about the axis of rotation C, a rotation of the cable harness 11*a* takes place. The process cable harness is configured to turn freely about its longitudinal axis.

What is claimed is:

1. A robot arm for an industrial robot, comprising a first arm part and a second arm part, wherein the second arm part is rotatably journalled in the first arm part for rotation about a first axis of rotation,
    wherein the robot arm further comprises a tubular member arranged with a first end rotatably journalled in the first arm part in a first and second bearing arranged at a distance from each other along the first axis of rotation and with a second end secured to the second arm part, such that the tubular member forms a continuous channel intended to receive a cable harness extended therethrough,
    wherein the second arm part comprises a first drive unit configured to rotate a wrist unit about a second axis of rotation,
    wherein the first drive unit is arranged with a drive shaft thereof parallel to and offset with respect to the first axis of rotation,
    wherein the second arm part comprises a second drive unit,
    wherein the second drive unit is arranged with a drive shaft thereof parallel to and offset with respect to the first axis of rotation, and
    wherein the second drive unit is adapted to rotate a turn disc in the wrist unit about a third axis of rotation.

2. The robot arm according to claim 1, wherein the second arm part comprises a shell with a first portion configured to surround a first part of the tubular member extended in a longitudinal direction along the first axis of rotation.

3. The robot arm according to claim 2, wherein the shell comprises a second portion with an elongated shape.

4. The robot arm according to claim 3, wherein the second portion, in its longitudinal extent, is arranged along and spaced apart from the first axis of rotation.

5. The robot arm according to claim 4, wherein the first drive unit is arranged in the second portion of the shell.

6. The robot arm according to claim 4, wherein the second drive unit is arranged in the second portion of the shell.

7. The robot arm according to claim 1, wherein the first and second drive units are arranged inside the second part.

8. The robot arm according to claim 3, wherein the first and second portions together form an L-shaped shell.

9. The robot arm according to claim 1, wherein the continuous channel has a first orifice and a second orifice, and wherein a length of the cable harness is arranged freely extending between the second orifice in the continuous channel and the wrist unit arranged on the second arm part.

10. The robot arm according to claim 9, wherein the length of the cable harness is arranged extending up to and past a first joint, included in the wrist unit, arranged for rotation about a second axis of rotation.

11. The robot arm according to claim 1, which is journalled in a single bearing.

12. The robot arm according to claim 1, wherein the wrist unit is journalled in a single bearing.

13. The robot arm according to claim 1, wherein the second arm part comprises a first and a second pinion arranged in parallel and adjacent to each other.

* * * * *